Sept. 12, 1950    J. R. SCHAFFER    2,522,138
RUBBER-TO-METAL ADHESION
Filed Sept. 11, 1945

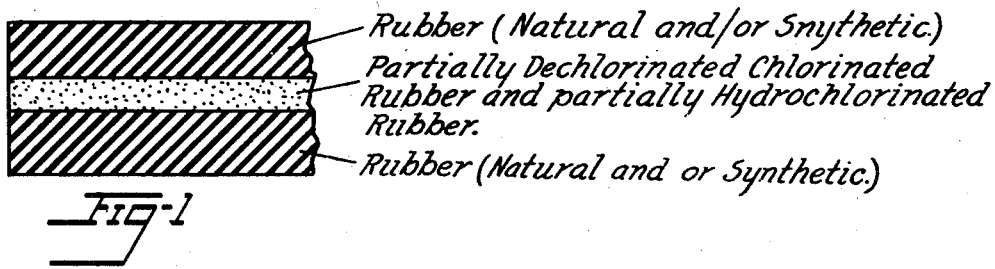

Rubber (Natural and/or Snythetic.)
Partially Dechlorinated Chlorinated Rubber and partially Hydrochlorinated Rubber.
Rubber (Natural and or Synthetic.)

Fig-1

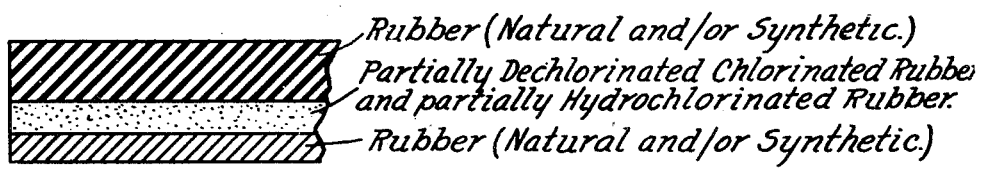

Rubber (Natural and/or Synthetic.)
Partially Dechlorinated Chlorinated Rubber and partially Hydrochlorinated Rubber.
Rubber (Natural and/or Synthetic.)

Fig-2

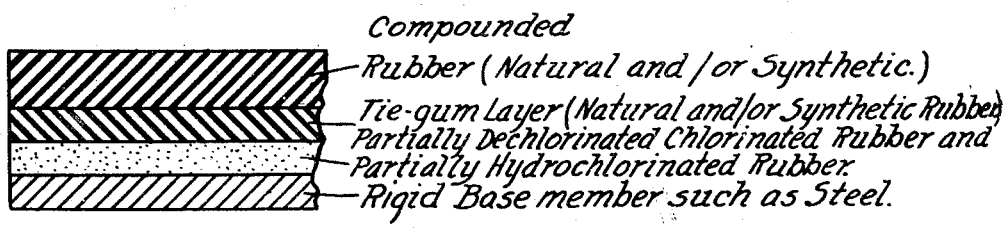

Compounded
Rubber (Natural and/or Synthetic.)
Tie-gum Layer (Natural and/or Synthetic Rubber)
Partially Dechlorinated Chlorinated Rubber and Partially Hydrochlorinated Rubber.
Rigid Base member such as Steel.

Fig-3

Inventor
James R. Schaffer
By Robert W. Furlong
Atty.

Patented Sept. 12, 1950

2,522,138

UNITED STATES PATENT OFFICE 2,522,138

RUBBER-TO-METAL ADHESION

James R. Schaffer, Akron, Ohio, assignor to The B. F. Goodrich Company, New York, N. Y., a corporation of New York Application September 11, 1945, Serial No. 615,706

15 Claims. (Cl. 154—130)

This invention relates to the uniting of rubber and the like to metallic and similar surfaces and particularly to an adhesive cement for that purpose.

Rubber to metal adhesion is a difficult problem for the manufacturer of composite rubber-metallic articles mainly because the known methods of rubber to metal adhesion suffer from a variety of disadvantages such as limitations on the types of rubber capable of being adhered, spotty and unreliable adhesion, difficulty of control, high cost, and undesirable multiplicity of operations.

It is an object therefore of this invention to provide a method of uniting rubber and the like which will economically produce superior and more reliable rubber to metal adhesion and which will be applicable to the adhesion of a wide variety of rubber compositions.

I have discovered that a rubber may be firmly and tenaciously adhered to metallic and similar surfaces by applying a new adhesive cement to a clean metallic surface, applying a vulcanizable rubber composition to the adhesive-coated surface and vulcanizing the assembly. The adhesive cement used in the method of my invention preferably comprises a solution in a volatile solvent of a partially decomposed chlorinated natural or synthetic rubber, a partially hydrochlorinated rubber, preferably together with a small proportion of a crude rubber and minor proportions of certain compounding ingredients such as carbon black or other coloring and reinforcing ingredients, fillers, age-resistors, and the like.

I have further discovered that the partially decomposed chlorinated synthetic rubbers may be substituted for the analogous derivatives of natural rubber with much the same results and in some instances, for the adhesion of particular synthetic rubbers to metal, the adhesives made from certain synthetic rubbers give particularly satisfactory results.

The partially decomposed chlorinated rubbers or component A of the adhesive of this invention may be any of the derivatives prepared by partial decomposition of a fully chlorinated rubber, which may be any of the chlorinated natural rubbers containing 65% or more chlorine or any of the fully saturated chlorinated synthetic rubbers prepared by known methods such as by passing gaseous chlorine into a dilute solution of the rubber. The partial decomposition of the fully chlorinated rubber may be accomplished in a number of ways, for example, by passing gaseous ammonia into a solution of the chlorinated rubber for a time sufficient to remove a small proportion of the chlorine. Similar results may be obtained by treating a solution of the chlorinated rubber with zinc dust or simply by heating the chlorinated rubber solution. Equally good results have been obtained by milling the solid chlorinated rubber on a heated rubber mill for a time sufficient to cause the desired partial decomposition. Still other methods of producing the partially decomposed chlorinated rubbers are possible.

The partially hydrochlorinated rubbers used in the invention (component B herein) may be formed in any manner known to the art as by bubbling a stream of anhydrous hydrochloric acid in gaseous form through a solution of a rubber in an organic solvent. If the hydrochlorination reaction is carried to saturation, a rubber derivative is obtained having a chlorine content of approximately 30 per cent. Such a derivative is hard and tough, while the partially hydrochlorinated rubber of this invention is a hydrochlorinated rubber obtained by stopping the hydrochlorination reaction at an early stage while the rubber still retains some of its softness and rubber-like properties.

The crude rubber used in the invention is preferably one of the crude rubbers from which one or both of the main components of the cement have been made. However, similar results may be obtained by adding other crude rubbers or mixtures of crude rubbers if desired.

The adhesive cement is made by adding the rubber derivatives, the crude rubber, and the desired compounding ingredients to a sufficient quantity of a volatile solvent to make a solution of proper consistency for application by brushing, spraying or spreading.

In the practice of the invention one or more coatings of the adhesive cement may be applied to the metallic surface before placing the rubber layer in contact therewith. If it is desired a coating of the cement may also be applied to the rubber layer. The assembled layers may then be subjected to heat and pressure to effect a bond. The conditions of temperature and pressure usually necessary to vulcanize the rubber layer are sufficient for bonding the metal and rubber layers together.

In order that the invention may be better understood, reference should be had to the accompanying drawing. Fig. 1 is an elevation in section, showing a layer of a rubber composition, either natural and/or synthetic, adhered to a second layer of rubber, which also may be natural and/or synthetic, by an adhesive layer comprising a partially dechlorinated chlorinated (component A hereinabove) and a partially hydrochlorinated rubber (component B). Fig. 2 is a similar elevation in section, representing an alternative manner of utilizing the adhesive of this invention comprising a layer of natural and/or synthetic rubber composition adhered to a rigid base member such as steel using an adhesive layer comprising a partially dechlorinated chlorinated rubber and a partially hydrochlorinated rubber. Fig. 3 represents still another manner of adhering a compounded rubber, either natural or synthetic, to a rigid base member using a tie gum layer (layer of gum rubber deposited from a cement) of uncompounded natural or synthetic rubber next to the compounded rubber and a layer of the adhesive composition next to a rigid base member such as steel. The relative thicknesses of the rubber layers and of the base member and the disposition of same shown in the drawing are chosen only to illustrate the invention and are not intended as a limitation on the invention.

The invention will now be described with reference to a number of specific examples.

Example 1

An adhesive was made of natural rubber employing a component A consisting of a partially decomposed chlorinated natural rubber and a component B consisting of a partially hydrochlorinated natural rubber.

Component A was prepared by dissolving 500 grams of a chlorinated natural rubber (65% chlorine) in 2500 grams of benzene. Anhydrous ammonia, in gaseous form, was passed into the solution for approximately four hours at 25° C. The solution was then heated to 75 to 80° C. to expel excess ammonia. The partially decomposed chlorinated rubber was precipitated by pouring the benzene solution into an excess of alcohol and the precipitate was dried in air. The dried product contained about 59% chlorine.

Component B was made by dissolving 100 grams of crepe rubber in about 2000 grams of benzene and bubbling anhydrous hydrochloric acid in gaseous form through the solution. Introduction of the hydrochloric acid was stopped when the derivative was found to contain approximately 10% chlorine. The solution containing the partially hydrochlorinated rubber was divided in half, one half was poured into alcohol to precipitate the partially hydrochlorinated rubber which was then washed and dried in air, and the other half was set aside to be used directly in an adhesive.

An adhesive was made by dissolving 20 grams of the dried component A, 3 grams of the dried component B and 2 parts of a rubber composition containing 50 parts crepe rubber and 50 parts carbon black in a mixed solvent consisting of 50 grams of carbon tetrachloride and 50 grams of benzene. The other half of the above solution of component B was used directly in the preparation of an adhesive as follows: 60 grams of the solution of component B was mixed with 20 grams of component A and 2 parts of a rubber composition comprising 50 parts crepe rubber and 50 parts carbon black. The two adhesives were found to be closely similar in adhesive properties. The following natural rubber tread-type composition was firmly and tenaciously adhered to steel.

| Ingredients: | Parts by weight |
| --- | --- |
| Smoked sheet rubber | 200 |
| Mercapto benzothiazol | 0.6 |
| Mercapto benzothiazyl disulfide | 1.2 |
| Diortho tolyl guanidine | 0.2 |
| Sulfur | 4.0 |
| Carbon black | 112.0 |
| Softening oil | 10.0 |
| Zinc oxide masterbatch (20% rubber) | 6.0 |
| Phenyl B naphthylamine | 3.0 |

Cure: 30 min. at 292° F. in a conventional press.

The partially decomposed chlorinated rubber or component A may be made by pyrolysis of a fully chlorinated rubber. The pyrolysis may be accomplished in a number of ways such as are illustrated by Examples 2 and 3.

Example 2

The adhesive of this example was made entirely of natural rubber derivatives and employed a component A consisting of a partially decomposed chlorinated rubber made by pyrolysis of a solution of a fully chlorinated rubber and a component B consisting of another portion of the component B solution set aside in Example 1.

Component A of this example was made by mixing 50 grams of chlorinated rubber (65% chlorine), 100 grams of xylene, 4 grams of dibutyl phthalate, 20 grams of carbon tetrachloride, and 26 grams of dipentene and stirring the mixture until the chlorinated rubber was dissolved. The solution was then heated at 95° C. for 2 hours. The solution was set aside to be used directly in adhesives. The solid derivative was separated from a sample of the solution and upon analysis it was found to contain 60% chlorine.

An adhesive cement was made by mixing 80 grams of the solution obtained in the production of component A with 60 grams of the component B solution obtained in Example 1 and by dissolving therein 2 grams of a rubber composition comprising 50 parts rubber and 50 parts carbon black. The adhesive was found to be a very good adhesive for uniting either the tread-type of rubber composition illustrated in Example 1 or the following synthetic rubber composition to steel:

| Ingredients: | Parts by weight |
| --- | --- |
| GRS-3 (butadiene 75–styrene 25) | 200.0 |
| Benzothiazyl-2 cyclohexyl sulfenamide | 2.0 |
| Diphenyl guanidine | 0.3 |
| Sulfur | 4.0 |
| Carbon black | 123.0 |
| Softening oil | 10.0 |
| Zinc oxide masterbatch (20% rubber) | 6.0 |
| Phenyl B naphthylamine | 2.0 |

Example 3

The adhesive of this example was made entirely of natural rubber derivatives and employed a component A consisting of a partially decomposed chlorinated rubber made by pyrolysis of a solid chlorinated rubber and a component B consisting of a portion of the solid component B prepared in Example 1.

Component A of this example was made by plasticizing 100 grams of a chlorinated rubber (65% chlorine) with 40 grams diethylene glycol butyl ether acetate on a hot roll mill at 260° F. 10 grams of carbon black were milled in and mass milled at 260° F. for 10 minutes. The high temperature and mastication is sufficient to remove a small proportion of the chlorine, the final product containing approximately 61% chlorine (based on original derivative).

An adhesive was made by mixing on a rubber mill 20 grams of component B with 12.5 grams of a rubber composition comprising 40 parts pale crepe rubber and 60 parts of carbon black. 20 grams of this mixture and 80 grams of component A were dissolved in a mixed solvent comprising 13 grams of acetonyl acetone, 40 grams of carbon tetrachloride, and 180 grams of xylene. The adhesive mixture so produced was an excellent rubber to metal adhesive for both plain gum and carbon black reinforced rubber compositions.

The following plain gum rubber composition was firmly and tenaciously adhered to grit-blasted steel:

Ingredients: Parts by weight
- Crepe rubber _____ 89.25
- Sulfur _____ 2.00
- Phenyl B naphthylamine_____ 1.00
- Zinc oxide masterbatch (20% rubber)_ 1.25
- Tetramethyl thiuram disulfide masterbatch (95% rubber)_____ 6.00
- Rosin oil_____ 0.50

Cure: 30 minutes at 260° F. in a conventional press.

Examples 4 and 5 illustrate the substitution of partially decomposed chlorinated synthetic rubbers for the analogous natural rubber derivatives of the foregoing examples.

*Example 4*

Component A, a partially decomposed chlorinated neoprene (polychloroprene) was prepared as follows:

100 grams of chlorinated neoprene (70% chlorine) were plasticized with 40 grams of diethylene glycol butyl ether acetate, and 10 grams of carbon black were added on the mill rolls. The mass then was milled at 260° F. for 10 minutes. Analysis of the final mixture revealed that the derivative contained 65-66% chlorine. Component B of this example, a partially hydrochlorinated natural rubber, was made according to the procedure for the component B of Example 1 except the introduction of the gaseous hydrochloric acid was continued until a partially hydrochlorinated rubber of 12% chlorine was obtained.

An adhesive cement was made by mixing 26 grams of component A, 5 grams of component B, and 3.5 grams of a rubber composition comprising 50 parts crude neoprene and 50 parts carbon black with 70 grams of xylene, 30 grams of carbon tetrachloride, and 3 grams of acetone. The adhesive was painted on freshly blasted steel and good adhesion of the above-described gum and carbon black reinforced natural and synthetic rubber compositions was obtained. In addition this adhesive was found to give extremely good adhesion of neoprene compositions to steel. A typical neoprene composition which was adhered to metal:

Ingredients: Parts by weight
- Neoprene _____ 100.0
- Phenyl B naphthylamine_____ 0.5
- Carbon black _____ 100.0
- Softening oil_____ 5.0
- Litharge _____ 20.0

Cure: 30 min. at 292° F. in a conventional press.

*Example 5*

An adhesive was made employing a component A consisting of a partially decomposed chlorinated polymer (50 parts butadiene-1,3–50 parts styrene) and a component B consisting of the partially hydrochlorinated natural rubber prepared in Example 1.

Component A was made by milling 100 grams of a chlorinated polymer (50 parts butadiene-1,3 and 50 parts styrene) for 5 minutes on a rubber mill at 260° F. The original chlorinated synthetic rubber contained about 58% chlorine and the final milled product contained about 54% chlorine.

The adhesive cement was made according to the procedure and proportions of Example 4 but crepe rubber was substituted for the crude neoprene in the adhesive. This adhesive gave particularly good adhesion of the synthetic tread-type compound of Example 2.

*Example 6*

Component A of this example was a partially decomposed chlorinated natural rubber prepared as in Example 3.

Component B, a partially hydrochlorinated natural rubber, was prepared by a procedure similar to that used to prepare the component B of Example 1. The hydrochlorination was continued until a partially hydrochlorinated rubber containing approximately 15% chlorine was obtained.

An adhesive was made by mixing 20 grams of component A (59% chlorine), 4 grams of component B, and 2 parts of a rubber composition comprising 60 parts crepe rubber and 40 parts of carbon black, 100 grams of xylene, and 3 grams of acetone. The adhesive was found to be a fair rubber to metal adhesive.

*Example 7*

Another adhesive was prepared which employed the same component A as Examples 3 and 6 and used a component B comprising a partially hydrochlorinated natural rubber containing 5% chlorine. The adhesive was compounded according to the proportions of Example 6 and was found to be a fair adhesive for adhering natural rubber compositions to steel.

The adhesive cements of the above examples and other cements to be made according to this invention may be used with or without secondary rubbery cements and/or gum rubber layers between the rubber layer to be adhered and the adhesive-coated metallic surface. Extremely good adhesion of all kinds of rubber compositions has been secured with the use of the adhesive cement of this invention alone but it is conceivable that in some instances, especially when adhering highly loaded rubber compositions to steel, it may be advantageous to use the above-described auxiliary adhesion aids.

The partially decomposed chlorinated rubber (component A herein) may contain various amounts of chlorine. A fully chlorinated rubber containing 65% or more chlorine does not produce an adhesive exhibiting good adhesion to metal. However, when a small proportion of chlorine perhaps ½, 1, 1½, or 2 percent or more is removed from the fully chlorinated rubber, the derivative will produce an adhesive exhibiting excellent rubber to metal adhesion. Excellent rubber to metal adhesion is obtained by the use of adhesives containing partially decomposed chlorinated rubbers of progressively lower chlorine contents, but, when the chlorine content of the partially decomposed chlorinated rubber reaches or goes below 50 to 55 percent gelling of the solution is apt to take place and the usefulness of the derivative in an adhesive will be diminished. It will be appreciated that the chlorine content at which gelling is apt to occur is not a sharp or definite point but is rather indefinite and dependent upon several variables which are not yet fully understood. The chlorine range of 50-55% is a region of instability, for instance, a partially decomposed chlorinated rubber may be prepared and no difficulty with gelling observed, but when compounded into the adhesive of this invention gelling is apt to occur upon standing.

The partially hydrochlorinated rubber (component B herein) may also contain various amounts of chlorine. A partially hydrochlorinated rubber containing only a few percent chlorine is soft and tacky, being much like crude rubber in its properties. As hydrochlorination progresses the derivative becomes less soft and less tacky until at a chlorine of approximately 30% the derivative is tough and horny. I have found that the rubber to metal adhesion of the adhesive first increases and then begins to drop off as the chlorine content of component B is increased. A partially hydrochlorinated rubber of less than 3% chlorine does not appreciably increase the adhesive properties of the adhesive cement of this invention. But when the chlorine content of the partially hydrochlorinated rubber is 3 to 5% or more, a significant improvement in rubber to metal adhesion is noted. Similar adhesion is noted when the partially hydrochlorinated rubber contains 7, 10, 12 and even 15 percent chlorine. A decrease in adhesive properties of the cement is observed when it contains a partially hydrochlorinated rubber of more than 15% chlorine.

The partially decomposed chlorinated rubber described above may be made of any rubbery material possessing, when unvulcanized, a structure made up of predominantly linear, long carbon chains comprising a multiplicity of intrachain carbon to carbon double bonds, including specifically such rubbery polymers of open-chain conjugated dienes as natural rubber (hevea), gutta percha, balata, guayule, polyisoprene, neoprene (polychloroprene), polybutadiene, butadiene-1,3 acrylonitrile polymers, butadiene-1,3 styrene polymers and in addition other polymers of butadiene-1,3 and its homologs with materials copolymerizable therewith such as acrylonitrile, styrene, methyl methacrylate, methyl acrylate, and the like.

The partially hydrochlorinated rubber described above may be made from any of the forms of natural rubber such as crepe rubber, smoked sheet, wild rubbers, latex and the like.

The adhesive cement of this invention may contain a minor proportion of a crude rubber, either natural or synthetic including any of the materials enumerated in the foregoing two paragraphs just above and in addition such rubber-like materials as polyisobutylene and the like. The crude rubber appears to function as a plasticizer for the rubber derivatives and is thought to increase the adhesion of the cement layer to the superposed layer of rubber composition. The proportion of the crude rubber will depend somewhat on the amount and properties of the component B being used in the adhesive as will be discussed below.

The proportions of component A (partially decomposed chlorinated rubber) and component B (partially hydrochlorinated rubber) may be varied somewhat. Four parts of component A to one part of component B has been found to give highly satisfactory results though proportions as low as 3 to 1 and as high as 6 to 1 have been used with success. The proportions of components A and B may be varied with the addition of varying proportions of crude rubber and other compounding agents. For instance, if the proportion of component A to component B is as much as 6 to 1, sufficient crude rubber may be used so that the proportion of component A to the sum of component B and crude rubber is substantially 4 to 1. I have found that with hydrochlorinated rubbers of low chlorine content, say 3 to 5%, it is not essential to add crude rubber. It will be appreciated, however, that it is to be desired to use a component B having at least 7, 10 or 12% chlorine (necessitating the admixture of crude rubber) for in this manner the use of component B is decreased, thereby reducing the cost of the adhesive.

The compounding ingredients that may be used are carbon black, coloring pigments, age resistors, fillers, and the like. Carbon black in many instances is a desirable component, for the consistency of the adhesive should preferably approach the consistency of the adhered rubber composition. An organic age-resistor is a desirable component of the adhesive if long service of the composite article is desired. The age resistors which may be used are phenyl B naphthylamine, phenyl alpha naphthylamine, diphenyl para phenylene diamine and the like or mixtures of the above or of any other age resistors known to the art.

The solvents which may be used alone or in combination in an adhesive of this invention are xylene, benzene, carbon tetrachloride, chloroform, dipentene, and other common solvents for the chlorinated and hydrochlorinated natural and synthetic rubbers as well as small quantities of acetone, ketones, gasoline, esters such as butyl acetate, and alcohols such as methyl and ethyl alcohol.

The adhesive of this invention has made possible a simple and economically feasible process of rubber to metal adhesion. With this cement it is possible to adhere both pure gum and carbon black reinforced compositions of a wide variety of natural and synthetic rubbers to metal.

Although especially valuable for adhering rubber to metal, for which the partially decomposed chlorinated rubbers and the partially hydrochlorinated rubbers appear to have special affinity, the present invention also will be found useful for adhering rubbers to other rigid base members such as wood, hard molded rubber and resins, glass and the like.

While the invention has been described with reference to certain specific embodiments and examples, it is not my intention to be limited thereto, for variations and modifications of the invention are possible without departing from the spirit and scope of the invention as defined in the appended claims.

I claim:

1. The method of adhering a vulcanizable rubber composition to a rigid base member which comprises interposing between the rubber and said base member a bonding layer of a composition comprising from 3 to 6 parts by weight of a partially dechlorinated chlorinated rubber containing 50 and 65% chlorine and made by removing chlorine from a fully chlorinated rubber, said fully chlorinated rubber being made by chlorination of an unvulcanized rubbery polymer of an open-chain conjugated diene having a structure made up of predominantly linear, long carbon chains comprising a multiplicity of intrachain carbon to carbon double bonds, and one part by weight of a partially hydrochlorinated rubber containing from 3 to 15% chlorine and made by hydrochlorinating an unvulcanized natural rubber, and vulcanizing the so-formed assembly.

2. The method of adhering a vulcanizable rubber composition to a rigid base member which comprises covering said member with at least one coat of an adhesive composition comprising from 3 to 6 parts by weight of a partially dechlorinated chlorinated rubber containing between 55 and 64.5% chlorine and made by removing chlorine from a fully chlorinated rubber, said fully chlorinated rubber being made by chlorinating unvulcanized natural rubber, and one part by weight of a partially hydrochlorinated rubber containing from 3 to 15% chlorine and made by hydrochlorinating an unvulcanized natural rubber, applying a layer to said vulcanizable rubber composition to said adhesive-coated member, and vulcanizing the so-formed assembly.

3. The method of adhering a vulcanizable rubber composition to a rigid base member which comprises coating said member with at least one coat of an adhesive composition comprising from 3 to 6 parts by weight of a partially dechlorinated chlorinated rubber containing from 55 to 64.5% chlorine made by removing chlorine from a fully chlorinated rubber, said fully chlorinated rubber being made by chlorination of a rubbery copolymer of butadiene-1,3 and styrene, and one part by weight of a partially hydrochlorinated rubber containing from 3 to 15% chlorine made by hydrochlorinating an unvulcanized natural rubber, applying a layer of said vulcanizable rubber composition to said adhesive-coated member, and vulcanizing the so-formed assembly.

4. The method of adhering a vulcanizable rubber composition to a rigid base member which comprises coating said base member with at least one coat of an adhesive composition comprising from 3 to 6 parts by weight of a partially dechlorinated chlorinated rubber containing from 55 to 65% chlorine and made by removing chlorine from a fully chlorinated rubber, said fully chlorinated rubber being made by chlorinating an unvulcanized polychloroprene, and one part by weight of a partially hydrochlorinated rubber containing from 3 to 15% chlorine and made by hydrochlorinating an unvulcanized natural rubber, applying a layer of said vulcanizable rubber composition to said adhesive-coated member and vulcanizing the so-formed assembly.

5. The method of adhering a vulcanizable rubber composition to a steel base member which comprises coating said base member with at least one coat of an adhesive composition comprising from 3 to 6 parts by weight of a partially dechlorinated chlorinated rubber containing from 55 to 64.5% chlorine and made by removing chlorine from a fully chlorinated rubber, said fully chlorinated rubber being made by chlorinating an unvulcanized natural rubber, one part of a partially hydrochlorinated rubber containing from 3 to 15% chlorine made by hydrochlorinating an unvulcanized natural rubber, a sufficient quantity of a crude rubber to yield a composition in which the ratio of the weight of said partially dechlorinated chlorinated rubber to the sum of the weights of said partially hydrochlorinated rubber and crude rubber is substantially four to one, and an organic age resistor, applying a layer of said vulcanizable rubber composition to said adhesive-coated member, and vulcanizing the so-formed assembly.

6. An adhesive composition comprising from 3 to 6 parts by weight of a partially dechlorinated chlorinated rubber containing from 50 to 65% chlorine and made by removing chlorine from a fully chlorinated rubber, said fully chlorinated rubber being made by chlorination of an unvulcanized rubbery polymer of an open-chain conjugated diene having a structure made up of predominantly linear, long carbon chains comprising a multiplicity of intra-chain carbon to carbon double bonds, and one part by weight of a partially hydrochlorinated rubber containing from 3 to 15% chlorine made by hydrochlorinating an unvulcanized natural rubber.

7. An adhesive cement comprising from 3 to 6 parts by weight of a partially dechlorinated chlorinated rubber containing from 55 to 64.5% chlorine and made by removing chlorine from a fully chlorinated rubber, said fully chlorinated rubber being made by chlorinating unvulcanized natural rubber, one part by weight of a partially hydrochlorinated rubber containing from 3 to 15% chlorine and made by hydrochlorinating an unvulcanized natural rubber, and a volatile solvent for said rubbers.

8. An adhesive cement comprising from 3 to 6 parts by weight of a partially dechlorinated chlorinated rubber containing from 55 to 64.5% chlorine and made by removing chlorine from a fully chlorinated rubber, said fully chlorinated rubber being made by chlorinating an unvulcanized rubbery copolymer of butadiene-1,3 and styrene, one part by weight of a partially hydrochlorinated rubber containing from 3 to 15% chlorine and made by hydrochlorinating an unvulcanized natural rubber, and a volatile solvent for said rubbers.

9. An adhesive cement comprising from 3 to 6 parts by weight of a partially dechlorinated chlorinated rubber containing from 55 to 65% chlorine and made by removing chlorine from a fully chlorinated rubber, said fully chlorinated rubber being made by chlorinating an unvulcanized polychloroprene, one part by weight of a partially hydrochlorinated rubber containing from 3 to 15% chlorine and made by hydrochlorinating an unvulcanized natural rubber, and a volatile solvent for said rubbers.

10. An adhesive cement comprising from 3 to 6 parts by weight of a partially dechlorinated chlorinated rubber containing 55 to 64.5% chlorine and made by removing chlorine from a fully chlorinated rubber, said fully chlorinated rubber being made by chlorinating unvulcanized natural rubber, one part by weight of a partially hydrochlorinated rubber containing from 3 to 15% chlorine made by hydrochlorinating an unvulcanized natural rubber, a sufficient quantity of a crude rubber to yield a composition in which the ratio of the weight of said dechlorinated chlorinated rubber to the sum of the weights of said partially hydrochlorinated rubber and said crude rubber is substantially four to one, an organic age resistor and a volatile solvent for said rubbers.

11. A composite product comprising a layer of a vulcanized rubber composition, a rigid base member, and an intermediate bonding layer comprising from 3 to 6 parts by weight of a partially dechlorinated chlorinated rubber containing from 50 to 65% chlorine and made by removing chlorine from a fully chlorinated rubber, said fully chlorinated rubber being made by chlorinating an unvulcanized rubbery polymer of an open-chain conjugated diene having a structure made up of predominantly linear, long carbon chains comprising a multiplicity of intra-chain carbon to carbon double bonds and one part by weight of a partially hydrochlorinated rubber containing from 3 to 15% chlorine made by hydrochlorinating an unvulcanized natural rubber.

12. A composite product comprising a layer of a vulcanized rubber composition, a rigid base member, and an intermediate bonding layer comprising from 3 to 6 parts by weight of a partially dechlorinated chlorinated rubber containing from 55 to 64.5% chlorine and made by removing chlorine from a fully chlorinated rubber, said fully chlorinated rubber being made by chlorinating unvulcanized natural rubber, and one part by weight of a partially hydrochlorinated rubber containing from 3 to 15% chlorine made by hydrochlorinating an unvulcanized natural rubber.

13. A composite product comprising a layer of a vulcanized rubber composition, a rigid base member, and an intermediate bonding layer comprising from 3 to 6 parts by weight of a partially dechlorinated chlorinated rubber containing from 55 to 65% chlorine and made by removing chlorine from a fully chlorinated rubber, said fully chlorinated rubber being made by chlorinating an unvulcanized polychloroprene, and one part by weight of a partially hydrochlorinated rubber containing 3 to 15% chlorine made by hydrochlorinating an unvulcanized natural rubber.

14. A composite product comprising a layer of a vulcanized rubber composition, a rigid base member, and an intermediate bonding layer comprising from 3 to 6 parts by weight of a partially dechlorinated chlorinated rubber containing from 55 to 64.5% chlorine made by removing chlorine from a fully chlorinated rubber, said fully chlorinated rubber being made by chlorinating a rubbery copolymer of butadiene-1,3 and styrene, and one part by weight of a partially hydrochlorinated rubber containing from 3 to 15% chlorine made by hydrochlorinating an unvulcanized natural rubber.

15. A composite product comprising a layer of a vulcanized rubber composition, a steel base member, and an intermediate bonding layer comprising from 3 to 6 parts by weight of a partially dechlorinated chlorinated rubber containing from 55 to 64.5% chlorine and made by removing chlorine from a fully chlorinated rubber, said fully chlorinated rubber being made by chlorinating unvulcanized natural rubber, one part by weight of a partially hydrochlorinated rubber containing from 3 to 15% chlorine made by hydrochlorinating an unvulcanized natural rubber, a sufficient quantity of a crude rubber to yield a composition in which the ratio of the weight of said dechlorinated chlorinated rubber to the sum of the weights of the partially hydrochlorinated rubber and crude rubber is substantially four to one, and an organic age resistor.

JAMES R. SCHAFFER.

REFERENCES CITED

The following references are of record in the file of this patent:

UNITED STATES PATENTS

| Number | Name | Date |
|---|---|---|
| 2,148,831 | Raynolds | Feb. 28, 1939 |
| 2,149,926 | Moore | Mar. 7, 1939 |
| 2,170,947 | Habgood et al. | Aug. 29, 1939 |
| 2,227,991 | Winkelmann | Jan. 7, 1941 |
| 2,259,190 | Winkelmann | Oct. 14, 1941 |